Sept. 19, 1961 W. L. HYDE 3,000,256
OPTICAL HEIGHT FINDERS
Filed Dec. 5, 1957

INVENTOR
*Walter Lewis Hyde*
BY
*Barlow & Barlow*
ATTORNEY

United States Patent Office 3,000,256
Patented Sept. 19, 1961

3,000,256
OPTICAL HEIGHT FINDERS
Walter Lewis Hyde, East Woodstock, Conn., assignor to American Optical Company, Southbridge, Mass., a voluntary association of Massachusetts
Filed Dec. 5, 1957, Ser. No. 700,812
6 Claims. (Cl. 88—1)

This invention relates to an aircraft altitude measuring system, and particularly, to an airborne measuring system for measuring the distance between the aircraft and the ground at relatively low altitude and, more broadly, for measuring the distance between two objects with apparatus located on one of the objects. Most of the devices in use today for measuring altitude rely upon measurements of barometric pressure or the time delay of a reflected radio beam. The first of these measures the elevation of the aircraft above sea level and gives no clue to the local irregularities of the ground. The second is well adapted to the measurement of high altitudes, but it is not in general possible to measure low altitudes because of the very short time delay.

The present invention is particularly designed for accurately measuring the distance of an aircraft above the ground when the distance is about two hundred feet or less, i.e., the distance is not large compared with the dimensions of the aircraft. The accurate determination of this distance is very important in modern high-speed aircraft because the location of the cockpit impedes accurate visual observation of the ground close to the plane, and the landing takes place at very high speed.

There is also a need for rapid automatic measurement of altitude and rate of descent in high speed aircraft so that the information can be introduced into automatic landing equipment. Such automatic landing control equipment is not a part of this patent.

It is therefore an object of the present invention to provide an apparatus based upon a light-reflecting triangulation principle and which will accurately measure the distance from an aircraft to the ground or the distance between two objects.

A further object of the invention is to provide an apparatus of the above character in which a coded light beam may be directed toward the ground and the reflection thereof received by a device which is angularly variable and which will automatically seek a distinguishing portion of the reflected light so as to determine the height of the aircraft as a function of the angle of reception.

A further object of the invention is to provide an improved altitude measuring system using a particularly simple method of coding and receiving a beam of light so that accurate measurements can be made at high speed in the presence of extraneous illumination.

A further object is to provide a system of the above type from which both an accurate measure of the altitude and the rate of descent may be deduced.

With these and other objects in view the invention consists of certain novel features of construction as will be more fully described and particularly pointed out in the appended claims.

Figure 1:
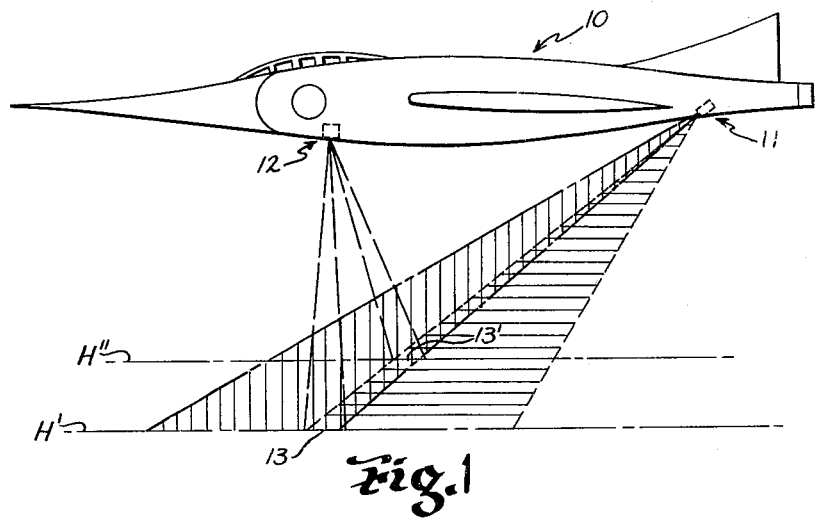
FIGURE 1 is a diagrammatic side elevational view showing schematically my altitude measuring system applied to an aircraft.

Referring now to the drawings and particularly to FIGURE 1, an aircraft 10 has mounted near the rear end thereof a light source 11 which has the form presently to be described. Positioned near the forward end of the fuselage is a light sensing means 12. From a practical standpoint, the mounting positions of the light source and light sensing means may be altered, as for instance, one may be in each wing. The criterion is to have the two spaced from each other and for reasons of increased accuracy, the spacing should be as great as possible. In FIGURE 1 the light source is at the tail of the plane and the receiver is near the nose, but it will be apparent that the two portions may be interchanged without changing the function of the device. The light source 11 is positioned at a fixed angle so as to direct two beams of light, which are represented in the drawing by horizontal and vertical cross-hatching, downward towards the ground. The two beams may be immediately adjacent to one another or overlap slightly or leave a small gap between without disturbing the functioning of the apparatus. The two beams must have appreciable angular size (10° to 30°) and the boundary between them must be oriented at right angles to a line connecting the source and receiver devices (the baseline). The light sensitive means 12 is made angularly variable so that at varying distances above the ground it may be oriented automatically to seek the boundary between the two beams of light as seen by reflection. The means by which the device automatically seeks this boundary will be described later. Two possible heights for the ground H′ and H″ are shown diagrammatically by broken line in FIGURE 1 and it will be apparent that the portion of the ground illuminated by the boundary between the two beams of light as at 13 and 13′, will assume a different angular position when viewed from the light sensitive means 12 in accordance with the altitude of the airplane above the ground. The height of the aircraft above the ground may then be determined in known trigonometric fashion from the knowledge of the angular position of the source, the angular position of the light sensitive means and the separation between the source and the light sensitive means along the base line. It is, of course, not necessary to have the light source fixed and the light sensitive means angularly variable as is described and shown, for it will be apparent that the light sensitive means may be fixed and the source made angularly variable.

Figure 2:
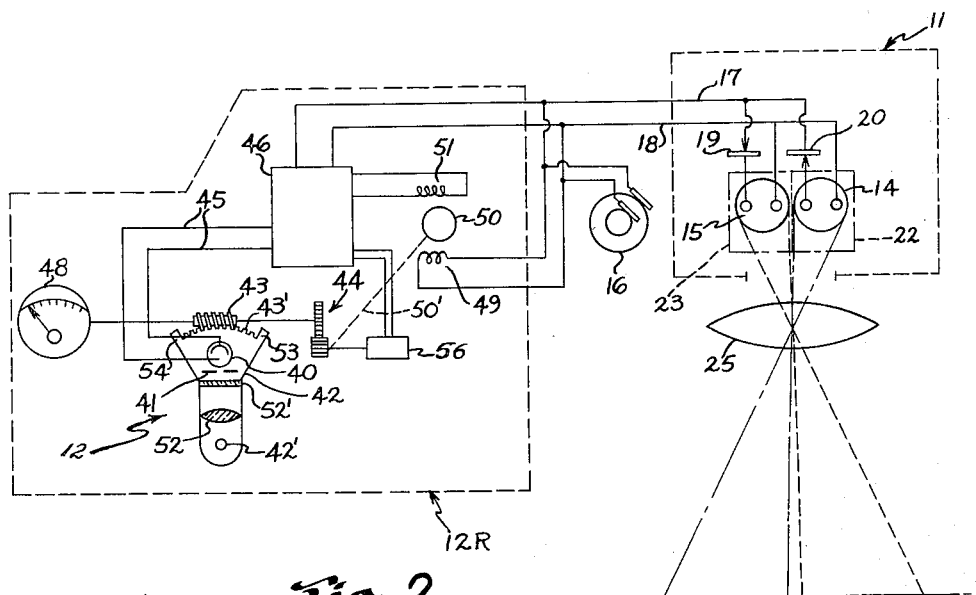
FIGURE 2 is a schematic diagram partially in block form showing the constructional details of the altitude measuring system and the circuits which may be employed therewith.

The method used to render the altitude measuring system automatic in operation is diagrammed in FIGURE 2. The light source unit 11 contains two high intensity light sources 14 and 15 which may be mercury arc lamps. These lamps are operated from a suitable source of alternating voltage such as is shown schematically at 16 in the form of an alternator and are coupled to the output of the alternator through leads 17 and 18. It will be noticed, however, that the light sources 14 and 15 are supplied from the alternating source through rectifiers 19 and 20, which are connected in a manner so that when one light source is lit, the other is extinguished. These lights 14 and 15 are mounted in a casing, such as is diagrammed in dashed lines, the casing for the lamp 14 being indicated by the numeral 22 and the casing for the lamp 15 being indicated by the numeral 23. These casings, including the lamps, are mounted closely adjacent each other and are oriented so that they lie at or near the rear focal plane of a positive lens 25, which positioning need not be accurate. If the axis of the lens lies between the two sources, as is shown in the diagram, it will be apparent that a region lying to one side of the axis of the lens will be illuminated by lamp 14 and a region lying to the other side of the axis of the lens will be illuminated by lamp 15, and it is these two beams of light originating from the two lamps which have been indicated by the vertically cross-hatched and horizontally crossed-hatched regions in FIGURE. 1.

The receiving device which is indicated generally as 12R in the left hand portion of FIGURE 2 contains a light sensitive element or photocell indicated as 40 which may be a photo-emissive cell, a photomultiplier cell, or photoconductive cell, and a servo-motor mechanism. The preferred light sensitive element when using visible or ultraviolet radiation is a photomultiplier photocell, but it will be apparent to those skilled in the art that under some circumstances a photoconductive cell sensitive to infra-red radiation will give superior performance.

To modify the spectral sensitivity of the light sensitive element, a filter 52' having the desired modifying characteristics may be inserted. This filter will ordinarily be chosen to have relatively high transmission for the wave lengths present in the source 11 and relatively low transmission for extraneous sources of light such as sunlight. The term "light" as referred to herein is intended to include the use of the visible portion of the spectrum or the ultra-violet or infra-red portions thereof.

The photocell is illuminated with light collected by a lens 52 and which also focuses the light at a given location relative to said cell. The light is preferably brought to a focus on a slit-shaped field-stop and to that end a slit stop 41 is shown mounted at the focal plane of the objective lens 52. The orientation of this slit is at right angles to the line connecting the source and the receiver and perpendicular to the plane of FIGURE 2. The slit is then parallel to the boundary between light sources 14 and 15 and thus parallel to the boundary between their respective beams of light on the ground. It will be clear to those skilled in the art that in some cases the sensitive area of the receiving photocell may in itself be slit-like in configuration. In this case an auxiliary field stop is unnecessary as the photocell itself serves this function, and in this case the sensitive area of the photocell should be located in the focal plane of the lens 52.

While the diagram, as shown in FIGURE 1, illustrates the two beams of light as overlapping each other to produce a boundary line therebetween, it is preferable that the area produced by said overlapping be restricted in width and smaller in angular size than the angular field of view through the restricted area or slit in the receiving system. This will render the servo-mechanism to be described, more positive in its function in seeking the null point or boundary line.

The relationship of the field stop 41 and the lens 52 serves to limit the light reaching the photocell to light from a particular direction. If the region seen by the receiver is to be variable, the relationship between these components must be altered by moving the field stop, moving the objective lens, or rotating the housing containing them both. By way of example the latter technique is shown. The lens, field stop, and photocell are mounted in a housing 42 which is pivoted around a center of rotation as at 42'. Concentric with the center of rotation 42' is a spur gear 43' which engages a worm drive 43. Rotation of this worm drive through a suitable gear train 44 will serve to change the angular position of the housing 42 and thus change the field of view of the receiving system. The motor drive for the gear train 44 is indicated schematically as the servo-motor 50 which is connected to the gear train in the diagram by suitable means indicated by the dash line 50'. The operation of this servo-motor will now be described.

The output of the light sensitive device or photocell is fed over leads 45 to a voltage amplifier and power amplifier of conventional design contained in control box 46. The signal from the photocell will be modulated at the same frequency and at the same phase as whichever light source it is instantaneously receiving. If that light comes from a region forward of the boundary line between the two beams of light, it will receive a signal arising from light source 14. If the light is coming from a region lying behind the boundary between the two beams, it will receive light from source 15. Since these two sources are modulated out of phase with one another the phase of the received signal becomes an indication of the zone from which the light is being received. This signal will be at the same frequency as that of the alternator 16.

The motor 50 is a servo-motor of conventional design, that is, the motor is provided with two windings 49 and 51. When the voltages impressed upon these two windings are in phase, the motor will turn in one direction, while when the voltages impressed on the two windings are 180° out of phase, the motor will turn in the opposite direction. When only one winding is activated the motor will not turn. It will be clear to those skilled in the art that the motor can now be connected to drive the gear train 44 and the worm gear 43 to change the field of view of the receiver system toward the null-point or boundary to be found between the two beams from light sources 14 and 15 wherein no signal is received or the signals from each source are equal. For example, assuming that the photocell "sees" source 15 and this source has a phase angle of 0°, then the motor 50 will rotate in one direction until the photocell "sees" the overlapping region 13. At this position the two signals approach equality and the voltage across winding will be a rectified A.C. or D.C. with a ripple causing no rotation. Similarly if the photocell "sees" source 14, which source has a phase angle of 180°, the motor will rotate in the other direction until the overlapping zone is reached and again the two received signals reach equality causing no rotation. The lack of rotation with equal signals is a practical result of a servo system of this nature since the inertia of the system is large enough to prevent the motor from following the half cycle "ripple D.C." fluctuations. The fact that a mixture of equal signals from both sources brings the motor to rest is what makes the angular size of the field stop 41 of secondary importance in the functioning of this altitude measuring device. When the receiver is pointed towards the boundary between the two beams of light the angular position of the housing can be read on a dial 48 or other suitable indicator which may be calibrated to indicate the height of the airplane by the trigonometric method which has already been described.

In order to stabilize the operation of the servo-mechanism just described, a tachometer generator 56 may be coupled to the output of the shaft of drive motor 50. The output leads of this tachometer generator 56 are then led back in to the amplifier 46 and fed in phase opposition to the signal from the photocell. The function of this device is, as is well understood in the art, to bring the motor 50 to a halt as rapidly as possible when the null point is reached, and thus to prevent oscillation or hunting of the servo-mechanism.

In order to start the operation of the system when approaching the ground from a high altitude, it is necessary to be sure that the receiver will be pointed at a portion of the ground illuminated by the source unit 11. To this end the receiver unit is constrained by stops 53 and 54 which limit the angular position which the receiver unit 12 can assume and thus prevent it from running "off scale."

When the aircraft altitude measuring system described herein is utilized to give information to an automatic landing device, it will ordinarily be necessary to deduce both the instantaneous altitude and its time derivative (the rate of descent). It will be noticed that it is one of the advantages of this system that the average output of the tachometer 56 is a measure of this rate of descent.

I claim:

1. A distance measuring device comprising means for directing two beams of light on overlaping angular paths toward a distant object to produce a boundary area between said beams, means for modulating said beams with separate intelligence, a receiver spaced from said light directing means having a light-sensitive cell responsive to light reflected from the object illuminated by said beams of light, and embodying a servo-motor mechanism having means associated with said light-sensitive cell for operating said motor mechanism in response to the nature of the modulated light received by said light-sensitive cell, means in said receiver for restricting the area of pick-up of said light to an angular limit less than the included angle of projection of one of said beams of light, and means associated with said servo-motor mechanism to indicate from the relative angular relationship of said beams of light and said receiver the distance being measured.

2. A device as in claim 1 wherein the means in said receiver for restricting the area of pick-up is a mask positioned adjacent said sensitive cell having a long narrow slit with its longitudinal axis disposed in a direction parallel with the transverse direction of the boundary area between said beams.

3. A distance measuring device comprising means for directing two beams of light on overlapping angular paths toward a distant object to produce a boundary area between said beams, means for modulating said beams with separate intelligence, a receiver spaced from said light directing means having a light-sensitive cell responsive to light reflected from the object receiving said beams of light, means in said receiver for restricting the area of pick-up to an angular limit less than the included angle of projection of one of said beams of light, a servo-motor mechanism having an input from the receiver and arranged to respond to a signal representing off-position relative to said boundary area and having an output to means for indicating the distance being measured.

4. A distance measuring device comprising means for directing two beams of light along an angular path to produce a given null point or boundary disposed in a transverse direction between said two beams, means for modulating said beams at the same frequency but in opposite phase to each other, a receiver spaced from said light directing means embodying a light-sensitive cell responsive to light reflected from an object receiving said two beams of light, a member having a long and narrow slit aligned with the light-sensitive cell, said slit having its longitudinal axis disposed in a direction parallel with the transverse direction of the null point or boundary line between said two beams, a collective lens adapted to receive the reflected light and direct it through the slit onto the light-sensitive cell, said slit being substantially in the focal plane of said lens, means operatively associating the receiver to a servo-motor mechanism arranged to respond to light from an off-position of said viewing means relative to said null point or boundary line and to automatically direct said receiver to said null point or boundary line and means associated with said servo-motor mechanism to indicate from the knowledge of the angular position of the light source, the angular position of the receiver when directed to said null point or boundary line and the separation between the light source, the distance being measured.

5. A device as in claim 4 wherein the modulating means comprises a source of alternating current and a half-wave rectifier in series with said source and the energizing means of each beam whereby said beams are modulated at the same frequency but in phase opposition.

6. A distance measuring device comprising means for directing two beams of light along a preset angular path relative to a baseline, means for modulating said beams at the same frequency and in phase opposition, said beams arranged to project energy to obtain a boundary therebetween, a receiver spaced from said beams along said baseline and having a light-sensitive cell responsive to light reflected from an object receiving said beams, said receiver mounted for pivotal movement about an axis normal to said baseline, a masking member having a slit mounted ahead of said cell the major dimension of said slit disposed parallel to the pivoting axis of said receiver and the said boundary between said beams, a servo-motor mechanism mechanically coupled to said receiver for creating pivotal movement thereof, said cell being coupled to an input of said mechanism, said servo-mechanism being responsive to a signal corresponding to off-position from said boundary to correct the angular position of said receiver, and means associated with the angular relationship of said receiver to indicate the distance being measured.

References Cited in the file of this patent
UNITED STATES PATENTS

| | | |
|---|---|---|
| 2,133,241 | Baker | Oct. 11, 1938 |
| 2,297,534 | Brulin | Sept. 29, 1942 |
| 2,350,820 | Rettinger | June 6, 1944 |
| 2,379,496 | Saunier | July 3, 1945 |
| 2,489,220 | Herbold | Nov. 22, 1949 |